(12) United States Patent
Klein

(10) Patent No.: US 9,756,134 B2
(45) Date of Patent: Sep. 5, 2017

(54) NETWORK ENTITY AND METHOD FOR MANAGING SESSION INITIATION PROTOCOL COMMUNICATIONS TOWARDS A USER ENTITY IN A COMMUNICATION NETWORK

(75) Inventor: Andreas Klein, Bonn (DE)

(73) Assignee: Deutsche Telekom AG, Bonn (DE)

( * ) Notice: Subject to any disclaimer, the term of this patent is extended or adjusted under 35 U.S.C. 154(b) by 104 days.

(21) Appl. No.: 13/816,600

(22) PCT Filed: Aug. 10, 2011

(86) PCT No.: PCT/EP2011/063763
§ 371 (c)(1),
(2), (4) Date: Feb. 12, 2013

(87) PCT Pub. No.: WO2012/020050
PCT Pub. Date: Feb. 16, 2012

(65) Prior Publication Data
US 2013/0151720 A1 Jun. 13, 2013

(30) Foreign Application Priority Data
Aug. 12, 2010 (EP) .................................... 10172586

(51) Int. Cl.
*G06F 15/16* (2006.01)
*H04L 29/08* (2006.01)
*H04L 29/06* (2006.01)

(52) U.S. Cl.
CPC ........ *H04L 67/141* (2013.01); *H04L 65/1063* (2013.01); *H04L 65/1016* (2013.01)

(58) Field of Classification Search
CPC .... H04L 29/08; H04L 67/141; H05L 65/1063

USPC ................ 709/227, 228, 229, 217, 218, 219
See application file for complete search history.

(56) References Cited

U.S. PATENT DOCUMENTS

| | | | |
|---|---|---|---|
| 5,907,544 A | 5/1999 | Rypinski | |
| 7,239,864 B2 | 7/2007 | Zhang | |
| 7,395,336 B1 * | 7/2008 | Santharam | H04W 60/06 709/227 |
| 7,640,036 B2 | 12/2009 | Kallio | |
| 7,721,106 B2 | 5/2010 | Zhang | |
| 8,083,586 B2 | 12/2011 | Foe et al. | |

(Continued)

FOREIGN PATENT DOCUMENTS

| | | |
|---|---|---|
| CN | 101132405 | 2/2008 |
| CN | 101433036 | 5/2009 |

(Continued)

OTHER PUBLICATIONS

English translation of WO2010031230 A1 provided by Espacenet.*

(Continued)

*Primary Examiner* — Liangche A Wang
*Assistant Examiner* — Kaylee Huang
(74) *Attorney, Agent, or Firm* — Brooks Kushman P.C.

(57) ABSTRACT

A network entity for managing Session Initiation Protocol (SIP) communications towards a user entity in a communication network. The network entity has a receiver and a processor. The receiver is configured to receive a first SIP message. The processor is configured to generate a second SIP message in response to receiving the first SIP message, the second SIP message having user-specific data relating to the user entity.

13 Claims, 5 Drawing Sheets

(56) References Cited

U.S. PATENT DOCUMENTS

| | | |
|---|---|---|
| 8,340,084 B2 | 12/2012 | Nakada et al. |
| 8,582,566 B2 | 11/2013 | Bae et al. |
| 8,811,954 B1 | 8/2014 | Mahdi et al. |
| 8,812,382 B2 * | 8/2014 | Koskinen ............. G06Q 20/102 705/35 |
| 2002/0193093 A1* | 12/2002 | Henrikson ............. H04W 4/24 455/407 |
| 2004/0180676 A1 | 9/2004 | Haumont et al. |
| 2004/0208144 A1 | 10/2004 | Vinayakray-Jani |
| 2004/0225878 A1 | 11/2004 | Costa-Requena et al. |
| 2005/0014485 A1 | 1/2005 | Kokkonen et al. |
| 2005/0059398 A1 | 3/2005 | Jaupitre et al. |
| 2005/0278447 A1 | 12/2005 | Raether et al. |
| 2006/0178131 A1 | 8/2006 | Huotari et al. |
| 2006/0271800 A1 | 11/2006 | Li et al. |
| 2007/0189301 A1* | 8/2007 | Kiss ................... H04L 65/1016 370/395.2 |
| 2007/0190990 A1 | 8/2007 | Yin |
| 2007/0249342 A1 | 10/2007 | Huang et al. |
| 2007/0259651 A1* | 11/2007 | Bae et al. ................. 455/412.1 |
| 2008/0002820 A1 | 1/2008 | Shtiegman et al. |
| 2008/0080480 A1 | 4/2008 | Buckley et al. |
| 2008/0215736 A1 | 9/2008 | Astrom et al. |
| 2008/0263631 A1 | 10/2008 | Wang et al. |
| 2008/0267171 A1 | 10/2008 | Buckley et al. |
| 2008/0299971 A1* | 12/2008 | Cai ................... H04L 65/1016 455/435.1 |
| 2009/0034736 A1 | 2/2009 | French |
| 2009/0193131 A1 | 7/2009 | Shi |
| 2009/0307482 A1* | 12/2009 | McCann ............. H04L 9/3244 713/153 |
| 2010/0015968 A1 | 1/2010 | Moriwaki et al. |
| 2010/0157985 A1 | 6/2010 | Nakada et al. |
| 2010/0177780 A1 | 7/2010 | Ophir et al. |
| 2010/0182998 A1 | 7/2010 | Nakada et al. |
| 2010/0215018 A1 | 8/2010 | Ejzak |
| 2010/0274908 A1* | 10/2010 | Koskelainen ................. 709/227 |
| 2011/0270995 A1 | 11/2011 | Mutikainen et al. |
| 2012/0005157 A1* | 1/2012 | Forsberg et al. ............ 707/608 |
| 2012/0026946 A1 | 2/2012 | Zhu et al. |

FOREIGN PATENT DOCUMENTS

| | | | | |
|---|---|---|---|---|
| CN | 101437093 | | 5/2009 | |
| CN | 101641937 | | 2/2010 | |
| EP | 1523208 | | 4/2005 | |
| EP | 1853037 | | 11/2007 | |
| EP | 2061269 | | 5/2009 | |
| EP | 2068529 | | 6/2009 | |
| EP | WO2011/072747 | * | 6/2011 | ............ H04W 64/00 |
| JP | 2001202014 | | 7/2001 | |
| JP | 2001297029 | | 10/2001 | |
| JP | 2007515690 | | 6/2007 | |
| JP | 2008543474 | | 12/2008 | |
| KR | 20090130296 | | 12/2009 | |
| WO | 03092218 | | 11/2003 | |
| WO | 2006120289 | | 11/2006 | |
| WO | 2008120028 | | 10/2008 | |
| WO | 2008145610 | | 12/2008 | |
| WO | 2008152133 | | 12/2008 | |
| WO | 2009074846 | | 6/2009 | |
| WO | WO 2010031230 A1 | * | 3/2010 | |

OTHER PUBLICATIONS

International Search Report for PCT/EP2011/063763, Completed by the European Patent Office on Sep. 1, 2011, 2 Pages.
Ericsson., 3GPP TSG SA WG2 Architecture—S2, No. 56, Jan. 15-19, 2007, 10 Pages, "Consideration of the relationship between Domain Selection and Personal Network Management."
Antipolis., ETSI TS 123 228 V6.8.0, 2004, 181 Pages, "Digital cellular telecommunications system (Phase 2plus); Universal Mobile Telecommunications Systems (UMTS); IP Multimedia Subsystem (IMS); Stage 2."
Rosenberg et al. Standards Track, RFC 3261, Jun. 2002, 240 Pages, "SIP Session Initiation Protocol."
Gonzalo., John Wiley and Sons Ltd, 2004, 20 Pages, "SIP Entities."
Gonzalo Camarillo et al. John Wiley and Sons Ltd, 2004, All together 423 Pages, "Chapter 5. Session Control in the IMS."
Korean Notice of Decision for Patent Translation attached to original for Korean Application No. KR 10-2015-0173431, Both completed by the Korean Patent Office, dated Mar. 20, 2017, All together 9 Pages.

* cited by examiner

NETWORK ENTITY AND METHOD FOR MANAGING SESSION INITIATION PROTOCOL COMMUNICATIONS TOWARDS A USER ENTITY IN A COMMUNICATION NETWORK

CROSS-REFERENCE TO RELATED APPLICATION

This application is the U.S. national phase of PCT Appln No. PCT/EP2011/063763 filed on Aug. 10, 2011, which claims priority to German Patent Application No. 10172586.9 filed on Aug. 12, 2010, the disclosures of which are incorporated in their entirety by reference herein.

TECHNICAL FIELD

The present invention relates to managing Session Initiation Protocol communications towards a user entity in a communication network.

BACKGROUND

For mobile data communications, layered communication networks may be deployed as e.g. described by the 3GPP specification (3rd Generation Partnership Project). The 3GPP specification comprises three distinct layers: an application layer, a network control layer and a connectivity layer. The application layer supports end-user applications and may be implemented in mobile stations or application servers in the network. The application layer interfaces with the network layer to enable designing and implementing different services and applications. The network control layer supports communicating services across e.g. different types of networks such as circuit-switched domain networks based on the GSM standard using e.g. an ISDN-related technology or packet-switched networks employing e.g. the GPRS (General Packet Radio Service) technology. The connectivity layer is a transport layer capable of transporting any type of service via e.g. voice, data and multimedia streams.

The 3GPP specification defines the Long Term Evolution (LTE) as an access network technology. The LTE comprises a MME (Mobility Management Entity) forming a control-entity suitable for signalling and selecting a serving gateway (SGW) which routes and forwards data packets carrying e.g. multimedia services. For delivering the multimedia services across the access network, the 3GPP specification defines the IP Multimedia Subsystem (IMS). The IMS comprises a service layer forming an application layer, a control and connectivity layer forming a network control layer, and an access layer forming a connectivity layer. The control and connectivity layer comprises call session control functions (CSCF) forming central entities for Session Initiation Protocol (SIP) signalling. According to the IMS, an application server is provided for hosting and executing services for user entities. An example of an application server is the Multimedia Telephony Service server (MMTel) offering multimedia communications such as voice. Another example of an application server is the Voice Call Continuity Server (VCC). The IMS further specifies a Home Subscriber Server (HSS), which is a master user database that supports the IMS network entities to handle calls. The HSS contains subscription-related information or subscriber profiles or user-specific data, performs authentication and authorization of user entities, and provides information about the subscriber's location and IP information.

According to the IMS, the application server interfaces with the Serving CSCF (S-CSCF) using the SIP. For establishing a communication link towards a user entity, the S-CSCF transmits a SIP invite message towards the application server. In response thereto, the application server may query the HSS for user-specific data indicating e.g. whether the user entity is accessible over a packet-switched access network or whether the user entity is accessible over a circuit-switched access network. However, if several application servers are deployed for communications, then a number of queries towards the HSS may result.

SUMMARY

It is the object of the invention to provide an efficient concept for distributing user-specific data in a communication network.

This object is achieved by the features of the independent claims. Further embodiments may be based on the features of the dependent claims.

The invention is based on the finding that in a communication network, e.g. in an IP Multimedia Subsystem (IMS), user-specific data relating to a user entity may efficiently be distributed upon the basis of Session Initiation Protocol (SIP) messages which are exchanged between network entities, e.g. between application servers. Wth exemplarily reference the IMS, a plurality of application servers may use the same user-specific data, e.g. information relating to a communication status of the user entity. Thus, e.g. a first application server which receives the user-specific data from a HSS may forward the received user towards other network entities, e.g. towards an S-CSCF or towards another application server.

According to some embodiments, the user-specific data may be fetched by a network entity which forwards the user-specific data to further network entities of the communication network for further communications.

According to some embodiments, the user-specific data may be provided to the further network entities, e.g. application servers, in the communication network, in particular before these application servers have the necessity to use the user-specific data.

According to some embodiments, the fetching network entity may forward the fetched user-specific data to other network entities in the communication network using a message or messages according to the SIP.

Further, according to some embodiments, the above mentioned application servers may not fetch said user-specific data because they receive the user-specific data included in the SIP message from the fetching network entity.

According to an aspect, the invention relates to an entity for managing SIP communications towards a user entity in a communication network. The network entity may have a receiver and a processor. The receiver may be configured to receive a first SIP message. The processor may be configured to generate a second SIP message in response to receiving the first SIP message, the second SIP message having user-specific data relating to the user entity.

By way of example, the reception of the first SIP message may trigger the generation of the second SIP message including said user-specific data.

According to an embodiment, the network entity further may have a transmitter for transmitting the second SIP message towards the communication network, in particular towards a further network entity.

By means of said transmitter, the network entity may have the ability to communicate the user-specific data to further network entities of the communication network.

The respective means, i.e. the receiver and the transmitter, may be implemented in hardware or in software. If said means are implemented in hardware then they may be embodied as a device, e.g. as a processor or as a computer, or as part of a system. If said means are implemented in software then they may be embodied as a computer program product, as a function, as a routine, as a program code or as an executable object.

According to an embodiment, the first SIP message is a SIP message, in particular a SIP Invite message according to the IMS standard, requesting to establish a communication link towards the user entity.

The SIP Invite message or SIP Invite request or SIP Invite may be used to establish a media session between user entities or user agents.

According to an embodiment, the processor is configured to insert the user-specific data into the first SIP message for generating the second SIP message.

Said second SIP message may include a request line, message headers and a body, said body may incorporate said user-specific data.

According to an embodiment, the processor may be configured to insert the user-specific data in the Extensible Markup Language (XML) format into the first SIP message for generating the second SIP message. The XML format is suitable for incorporating the user-specific data in the body of the SIP message, as the second SIP message.

According to an embodiment, the processor may be configured to provide the user-specific data, the user-specific data being trusted in the communication network. Said user-specific data may be trusted in the communication network, i.e. the receiving network entity may have the certainty that said user-specific data includes correct information relating to the user entity. For example, said trusted user-specific data may be provided by the HSS.

According to an embodiment, the processor may be configured to initiate a transmission of a request for the user-specific data towards the communication network. Thus, the processor may have an interface or an interface entity or may be coupled to an interface entity which is capable of transmitting a request towards the communication network for receiving said user specific data. In particular, the processor may be configured to request user-specific data from a networkdatabase and to receive the requested user-specific data from said network database.

According to an embodiment, the receiver may be configured to receive the user specific-data over a communication network, in particular from a HSS or from a User Profile Server Function (UPSF).

According to an embodiment, the user-specific data may indicate at least one of: a current communication status of the user entity in a packet-switched domain of the communication network, a current communication status of the user entity in a circuit-switched domain of the communication network, a location of the user entity, prepaid information of the user entity. The communication status related to the packet-switched domain may indicate if the user entity is busy or idle in said packet-switched domain of the communication network. Further, said communication status related to the circuit-switched domain may indicate if said user entity is busy or idle in said circuit-switched domain of the communication network. The location of the user entity may indicate a particular location of the user entity in the communication network. The prepaid information of the user entity may include information regarded to the available amount of money the respective user entity may use for services provided in the communication network.

According to an embodiment, the network entity may be an application server. Particularly, the network entity may be a Multimedia Telephony (MMTel) entity of the IMS.

According to a further aspect, the invention relates to a system for managing SIP communications in an IMS communication network. The system may have at least an above described network entity embodied as an application server, in particular as a MMTel entity of the IMS, a further network entity, in particular a Serving Call Session Control Function (S-CSCF), and an application server. The S-CSCF may be configured to remove the user-specific data from the second SIP message. The network entity may be configured to transmit the second SIP message including the user-specific data towards the further network entity. Furthermore, the further network entity may be configured to forward the second SIP message towards the application server for further communications. The application server may be configured to re-use the user-specific data of the received second SIP message.

According to a further aspect, the invention relates to a method for managing SIP communications towards a user entity in a communication network. The method may have a step of receiving a first SIP message. Further, the method may have a step of generating a second SIP message in response to receiving the first SIP message, the second SIP message having user-specific data relating to the user entity.

According to a further aspect, the invention relates to a computer program comprising a program code for executing the method for managing SIP communications towards a user entity in a communication network.

According to a further aspect, the invention relates to a method for managing SIP communications in an IMS communication network. The method may have a step of receiving a first SIP message at the network entity. Further, the method may have a step of generating a second SIP message at the network entity in response to receiving the first SIP message, the second SIP message having user-specific data relating to the user entity. Moreover, the method may have a step of transmitting the second SIP message to a further network entity, in particular an S-CSCF. Furthermore, the method may have a step of forwarding the second SIP message by the further network entity towards at least one application server for re-using the user-specific data.

According to a further aspect, the invention relates to a plurality of computer programs. Each of said computer programs may have a program code for executing at least one step of the method for managing SIP communications in an IMS communication network.

BRIEF DESCRIPTION OF THE DRAWINGS

Further embodiments will be described with reference to the following figures, in which.

DETAILED DESCRIPTION

Figure 1:
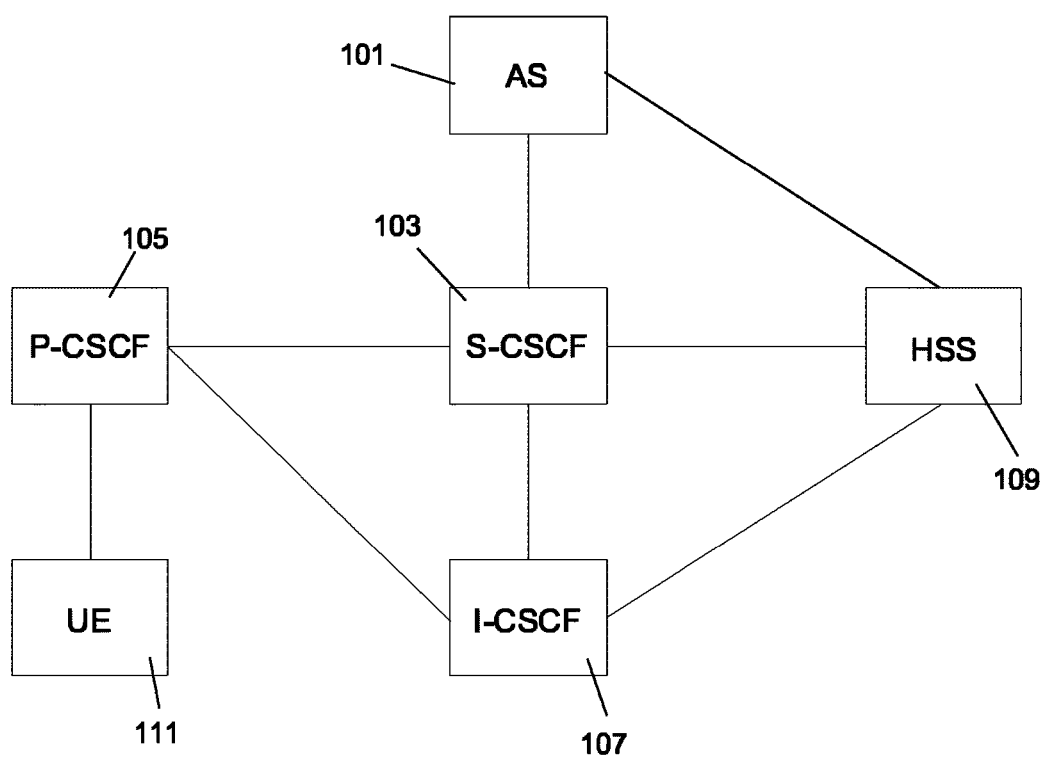
FIG. 1 shows an embodiment of a block diagram of a communication system.

FIG. 1 exemplarily shows a block diagram of a communication system implementing the IMS architecture as defined by the 3GPP specification TS 23.228. The communication system comprises an application server 101 (AS), a Serving Call Session Control Function 103 (S-CSCF), a Proxy-CSCF 105 (P-CSCF), and an Interrogating-CSCF (I-CSCF) 107. The S-CSCF 103, the P-CSCF 105 and the I-CSCF 107 respectively form implementations of network control entities communicating with each other. The S-CSCF 103 and the I-SCSF 107 further communicate with a Home Subscriber Server 109 (HSS). The P-CSCF 105 communicates with at least one user entity 1 11 (UE).

The S-CSCF 103, the P-CSCF 105 and the I-CSCF 107 are used to process Session Initiation Protocol (SIP) signaling packets in the IMS communication system. The S-CSCF 103 is a central node of the signaling layer and is arranged to handle SIP registrations of a UE 111 for IMS communications. In particular, the S-CSCF 103 has knowledge of user identification such as IMSI uniquely identifying the user entity 111. The I-CSCF 107 is arranged to query the HSS 109 to obtain an address of the S-CSCF 103, and to assign the S-CSCF 103 to the user entity 111 for performing the SIP registration. The I-CSCF 107 also forwards session initiation requests such as SIP invites towards the S-CSCF, and receives session initiation requests from the S-CSCF 103. The P-CSCF 105 is a SIP proxy that is the first point of contact for the UE 111. The AS 101 is SIP application server, e.g. a Multimedia Telephony Service server (MMTel) or a Voice Call Continuity Server (VCC). The AS 101 hosts and executes services for the UE 111. The AS 101 interfaces with the S-CSCF 103 using the SIP protocol, and interfaces with the HSS 109 using the Sh interface as defined by the IMS standard.

The AS 101 is configured to receive a first SIP message. In response to receiving the first SIP message, the AS 101 is further configured to generate a second SIP message. The second SIP message comprises user-specific data relating to the UE 111. In particular, the AS 101 inserts the user-specific data into the first SIP message for providing the second SIP message S2.

Figure 2:
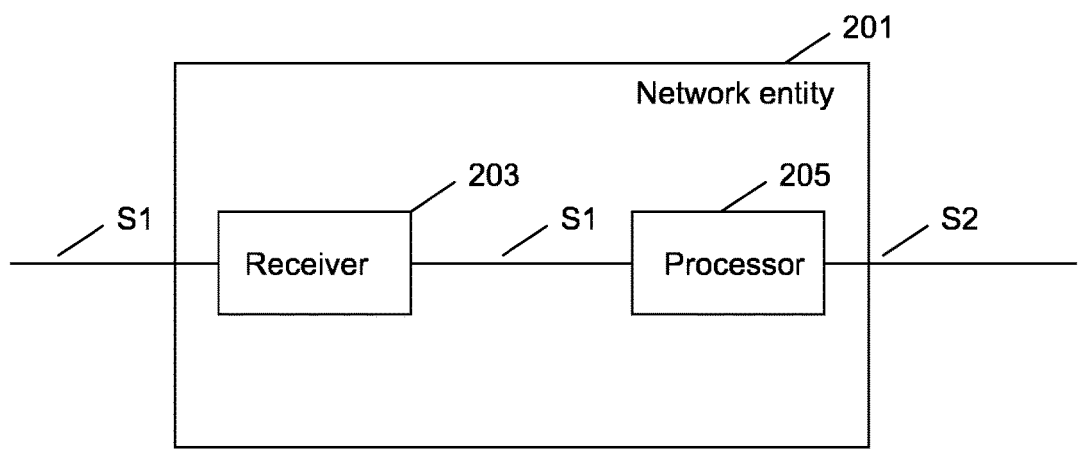
FIG. 2 shows an embodiment of a network entity for managing SIP communications towards a user entity in a communication network.

In FIG. 2, an embodiment of a network entity 201 for managing SIP communication towards a user entity in a communication network is illustrated. The network entity 201 may have a receiver 203 and a processor 205. The network entity 201 may be an application server. Said application server may be a Multimedia Telephony (MMTel) entity of the IMS.

According to an implementation, the receiver 203 is configured to receive a first SIP message S1. Said processor 205 may be configured to generate a second SIP message S2 in response to receiving the first SIP message S1. The second SIP message S2 may have user-specific data relating to the user entity. In particular, the processor 205 may be configured to insert the user-specific data into the first SIP message S1 for generating the second SIP message S2. The user-specific data may be in the XML format.

The first SIP message S1 may be embodied as follows:

```
INVITE sip:userB@example.com SIP/2.0
Max-Forwards: 70
From: <sip:userA@example.com>
To: <sip:userB@example.com>
...
Content-Length: 0
```

The second SIP S2 message may be embodied as follows:

```
INVITE sip:userB@example.com SIP/2.0
Max-Forwards: 70
From: <sip:userA@example.com>
To: <sip:userB@example.com>
...
Content-Type: application/as-to-as-info+xml
Content-Length: (...)
<?xml version="1.0"?>
<as-to-as-info ...>
    <userstate>
        <csbusy>true</csbusy>
            <psbusy>false</psbusy>
    </userstate>
    <location>
        ...
    </location>
    ...
</as-to-as-info>
```

For example, the user-specific data indicates at least one of: a current communication status of the user entity in a packet-switched domain of the communication network, e.g. "psbusy", a current communication status of the user entity in a circuit-switched domain of the communication network (see above "csbusy"), a location of the user entity, e.g. "location", prepaid information of the user entity.

Figure 3:
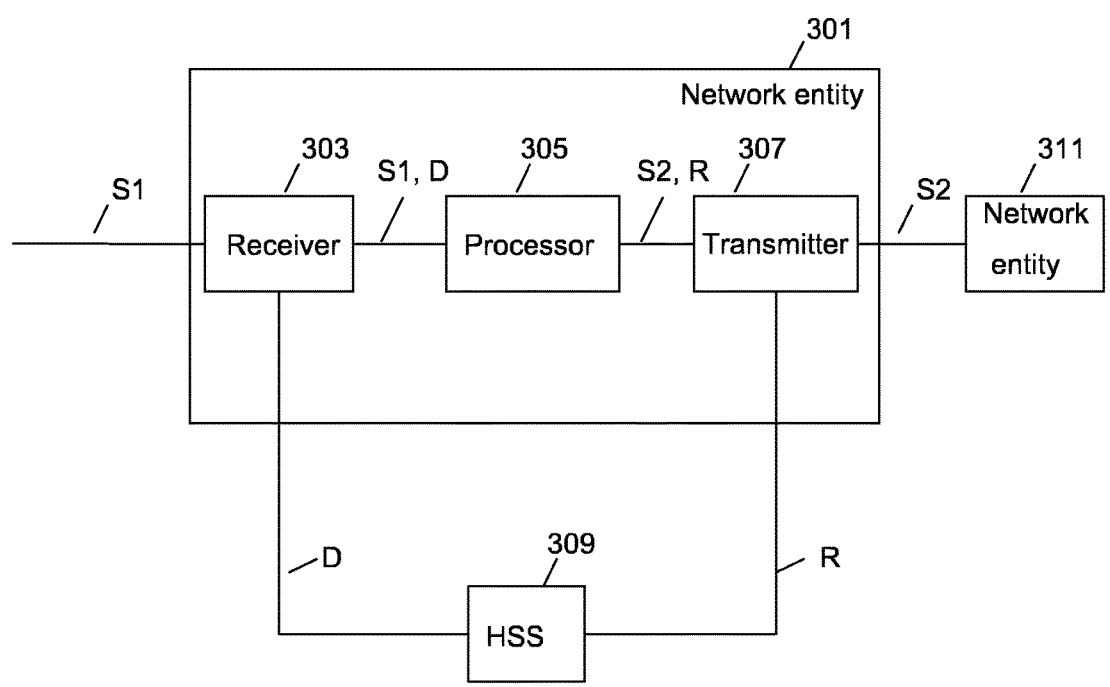
FIG. 3 further shows an embodiment of a network entity for managing SIP communications towards a user entity in a communication network.

FIG. 3 shows an embodiment of a network entity 301 for managing SIP communications towards a user entity in a communication network. The network entity 301 may have a receiver 303, a processor 305 and a transmitter 307.

According to an implementation, the receiver 303 receives a first SIP message 51. The receiver 303 forwards the received first SIP message S1 to the processor 305. The processor 305 initiates a transmission of a request R for the user-specific data D towards a Home Subscriber Server (HSS) 309. The receiver 303 receives the user-specific data D from the HSS 309 and forwards it to the processor 305. The processor 305 inserts the received user-specific data D into the first SIP message S1 for generating the second SIP message S2.

According to an implementation, the processor 305 forwards the generated second SIP message S2 to the transmitter 307. The transmitter 307 transmits the second SIP message S2 to a further network entity 311.

Figure 4:
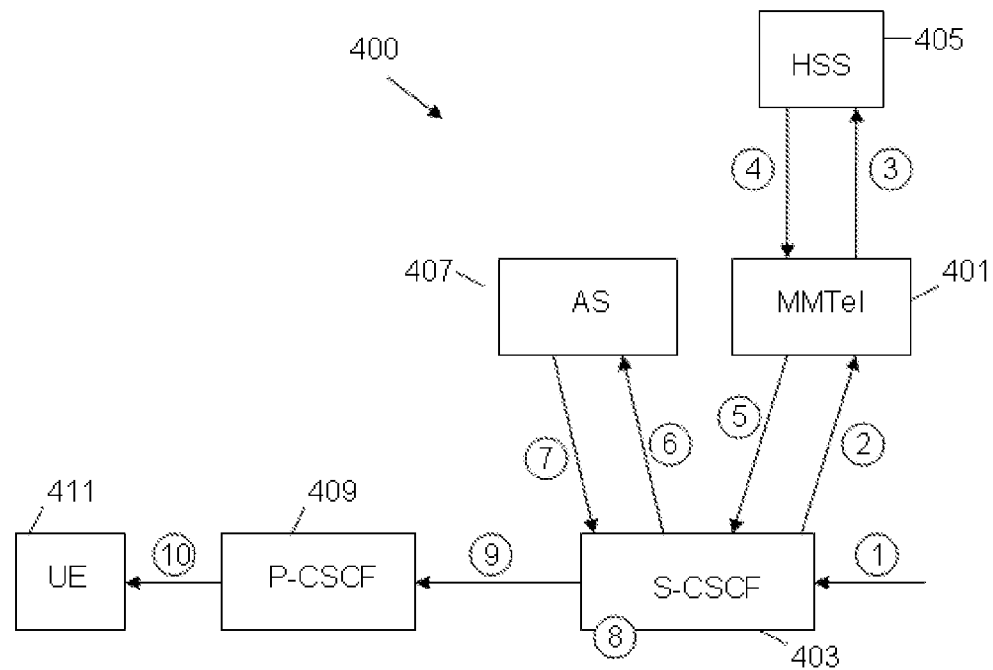
FIG. 4 shows an embodiment of a system for managing SIP communications in an IMS communication network.

In FIG. 4, an embodiment of a system 400 for managing SIP communications in an IP IMS communication network is shown.

According to an implementation, the system 400 has an MMTel server 401 forming an implementation of a network entity such as an S-CSCF 403, an HSS 405, an application server (AS) 407, a Proxy-Call Session Control Function (P-CSCF) 409 and a user entity (UE) 41 1.

According to an implementation, the system shown in FIG. 4 is arranged to perform the following steps 1 to 10:

In step 1, the S-CSCF 403 receives a SIP Invite. In step 2, the S-CSCF 403 forwards the received SIP Invite to the MMTel 401. In step 3, the MMTel 401 requests user-specific data from HSS 405. In step 4, the MMTel 401 receives the requested user-specific data from HSS 405. The user-specific data may include a current communication status of the user entity 411 in a packet-switched domain of the communication network, a current communication status of the user entity 401 in a circuit-switched domain of the communication network, location of the user entity 411 or prepaid information of the user entity 411.

In step 5, the MMTel 401 transmits the SIP Invite in which the user-specific data is included, in the following also referenced as enhanced SIP Invite, to the S-CSCF 403.

In step 6, the S-CSCF 403 forwards the enhanced SIP Invite to a further application server 407. The further application server 407 may use the included user-specific data. The application server 407 may have not the necessity to request the user-specific data from the HSS 405.

In step 7, the application server 407 transmits the enhanced SIP Invite back to the S-CSCF 403.

In step 8, the S-CSCF 403 removes the user-specific data from the enhanced SIP Invite to generate a SIP Invite.

In step 9, the generated SIP Invite is transmitted from the S-CSCF 403 to the P-CSCF 409. In step 10, the P-CSCF 409 forwards the SIP Invite to the user entity 411.

Figure 5:
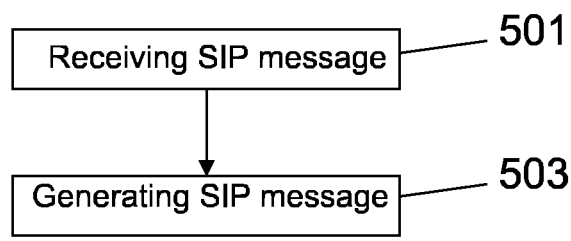
FIG. 5 shows an embodiment of a method for managing SIP communications towards a user entity in a communication network.

FIG. 5 shows an embodiment of a method for managing SIP communications towards a user entity in a communication network.

In step 501, a first SIP message is received at a network entity, e.g. at the network entity 201, 301, 401.

In step 503, a second SIP message is generated at the network entity in response to receiving the first SIP message. The second SIP message may have user-specific data relating to the user entity.

Figure 6:
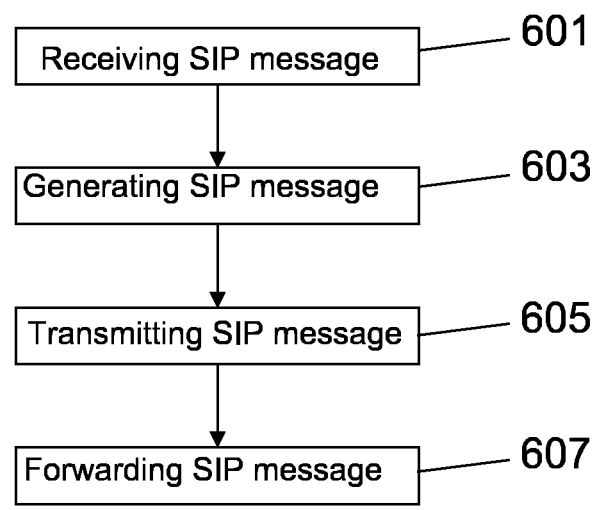
FIG. 6 further shows an embodiment of a method for managing SIP communications in an IMS communication network.

FIG. 6 depicts an embodiment of a method for managing SIP communications in an IP IMS communication network.

In step 601, a first SIP message is received at a network entity, e.g. by the receiver 203, 303 of the network entity 201, 301, 401.

In step 603, a second SIP message is generated at the network entity, e.g. by the processor 205, 305 in response to receiving the first SIP message, the second SIP message having user-specific data relating to user entity.

In step 605, the second SIP message is transmitted from the network entity to an S-CSCF, e.g. by the transmitter 307.

In step 607, the second SIP message is forwarded, e.g. transmitted by the transmitter 307, by the S-CSCF towards at least one application server for re-using said user-specific data.

According to some implementations, the user-specific data is distributed among application servers which may reduce a number of queries a HSS in an IMS communication network.

The above-mentioned embodiments and implementations of the methods of the present invention may be embodied by respective means to be a respective embodiment of the network entity of the present invention.

Features of any embodiment or implementation presented herein may be combined with other features and other embodiments or implementations presented herein wherever it seems technologically desirable.

The previous description of the disclosed embodiments is provided to enable any person skilled in the art to make or use the present invention. Various modifications to these embodiments will be readily apparent to those skilled in the art, and the generic principles defined herein may be applied to other embodiments, arrangements or systems without departing from the spirit or scope of the invention. Thus, the present invention is not intended to be limited to the embodiments shown herein but is to be accorded the widest scope consistent with the principles disclosed herein.

The invention claimed is:

1. A system for managing Session Initiation Protocol communications in an IP Multimedia Subsystem communication network, the system comprising:
    a network entity for managing the Session Initiation Protocol communications towards a user entity in the communication network, the network entity including:
        a receiver for receiving a first Session Initiation Protocol message from a second network entity comprising a Serving Call Session Control Function (S-CSCF);
        a transmitter for transmitting a second Session Initiation Protocol message over the communication network towards a third network entity comprising an application server; and
        a processor for generating the second Session Initiation Protocol message in response to receiving the first Session Initiation Protocol message, the second Session Initiation Protocol message having user-specific data relating to the user entity, wherein the user-specific data is received from a fourth network entity comprising a Home Subscriber Server (HSS),
        wherein the processor is configured to insert the user-specific data into the first Session Initiation Protocol message for generating the second Session Initiation Protocol message, and the user-specific data indicates a current communication status of the user entity in both a packet-switched domain and a circuit-switched domain of the communication network;
    the second network entity being a hardware entity comprising the Serving Call Session Control Function;
    the third network entity comprising the application server; and
    a fifth network entity comprising a Proxy Call Session Control Function (P-CSCF), wherein
    the network entity is configured to transmit the second Session Initiation Protocol message including the user-specific data towards the second network entity; wherein
    the second network entity is configured to forward the second Session Initiation Protocol message towards the application server comprised in the third network entity, the application server using the user-specific data; and wherein
    the second network entity is configured to remove the user-specific data from the second Session Initiation Protocol message before forwarding the second Session Initiation Protocol message towards the P-CSCF comprised in the fifth network entity.

2. The system of claim 1, the network entity further comprising the transmitter for transmitting the second Session Initiation Protocol message over the communication network towards a further network entity.

3. The system of claim 1, wherein the first Session Initiation Protocol message is a Session Initiation Protocol Invite message requesting to establish a communication link towards the user entity.

4. The system of claim 1, wherein the processor is configured to insert the user-specific data in an Extensible Markup Language format into the first Session Initiation Protocol message for generating the second Session Initiation Protocol message.

5. The system of claim 1, wherein the processor is configured to provide the user-specific data, the user-specific data being trusted in the communication network.

6. The system of claim 1, wherein the processor is configured to initiate a transmission of a request for the user-specific data towards the communication network.

7. The system of claim 1, wherein the receiver is configured to receive the user-specific data over the communication network, in particular from the HSS or from a User Profile Server Function.

8. The system of claim 1, wherein the user-specific data indicates a location of the user entity.

9. The system of claim 1, wherein the network entity is a Multimedia Telephony entity application server of the IP Multimedia Subsystem.

10. The system of claim 1, wherein the user-specific data indicates prepaid information of the user entity.

11. The system of claim 1, wherein the P-CSCF is configured to forward the second Session Initiation Protocol message towards the user entity.

12. A method for managing Session Initiation Protocol communications towards a user entity in a communication network, the method comprising:
    receiving user-specific data relating to the user entity from a fourth network entity comprising a Home Subscriber Server (HSS);
    receiving a first Session Initiation Protocol message from a second network entity comprising a Serving Call Session Control Function (S-CSCF);
    transmitting a second Session Initiation Protocol message over the communication network towards a third network entity comprising an application server;
    generating the second Session Initiation Protocol message in response to receiving the first Session Initiation Protocol message, the second Session Initiation Protocol message having the user-specific data relating to the user entity;
    inserting the user-specific data into the first Session Initiation Protocol message for generating the second Session Initiation Protocol message, the user-specific data indicating a current communication status of the user entity in both a packet-switched domain and a circuit-switched domain of the communication network;
    transmitting the second Session Initiation Protocol message including the user-specific data towards the second network entity;
    forwarding, by the second network entity, the second Session Initiation Protocol message towards the application server comprised in the third network entity for using the user-specific data; and
    removing, by the second network entity, the user-specific data from the second Session Initiation Protocol message before forwarding the second Session Initiation Protocol message towards a Proxy Call Session Control Function (P-CSCF) comprised in a fifth network entity.

13. A non-transitory computer-readable medium comprising program code that, when executed by a processor of a computing device, is configured to cause the device to perform the method of claim 12.

* * * * *